Figure 1:
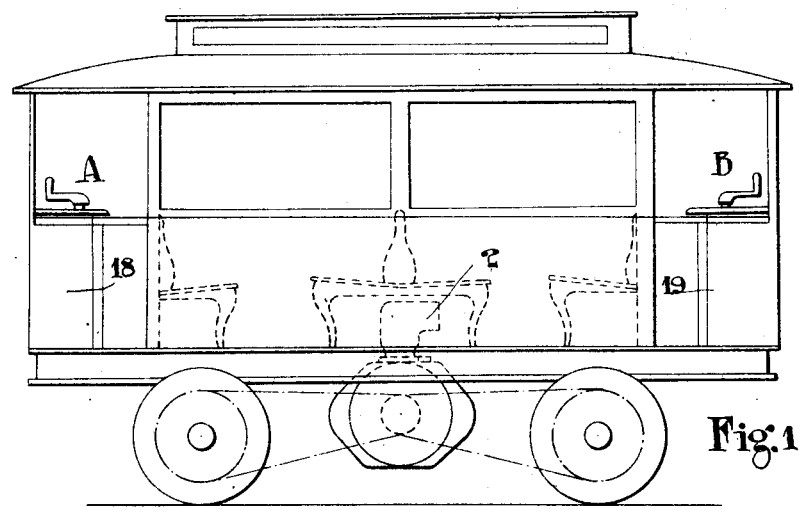

H. PIEPER.
APPARATUS FOR CONTROLLING MOTOR VEHICLES DRIVEN BY MIXED POWER.
APPLICATION FILED NOV. 27, 1909.

1,140,849.

Patented May 25, 1915.
11 SHEETS—SHEET 1.

H. PIEPER.
APPARATUS FOR CONTROLLING MOTOR VEHICLES DRIVEN BY MIXED POWER.
APPLICATION FILED NOV. 27, 1909.
1,140,849.
Patented May 25, 1915.
11 SHEETS—SHEET 3.
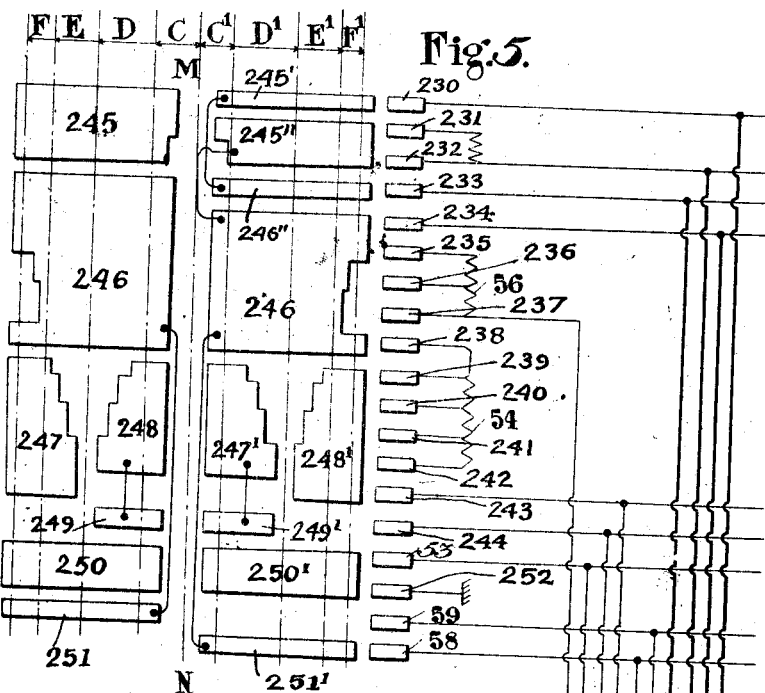
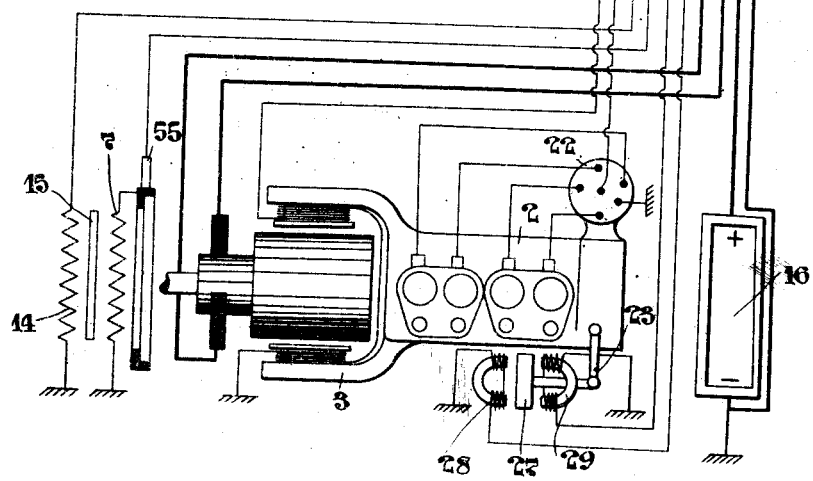

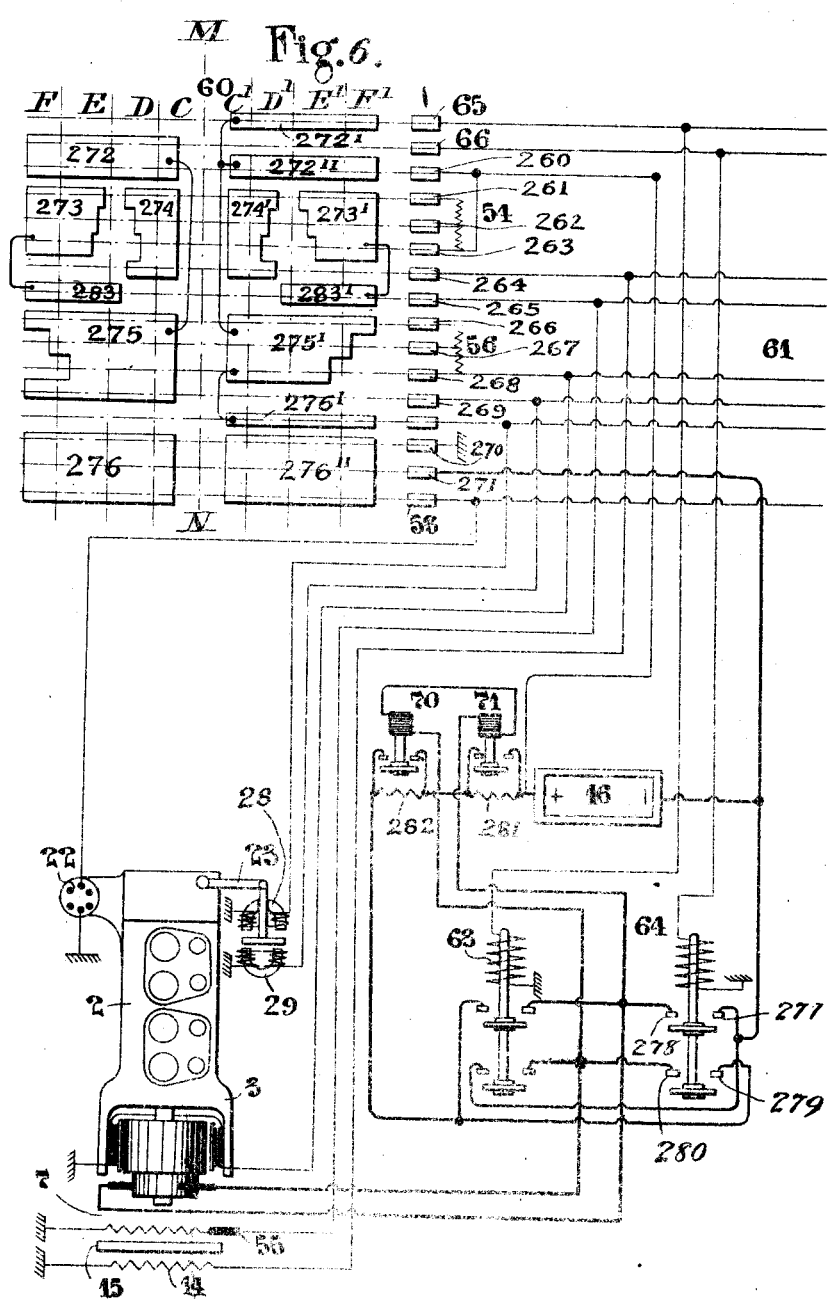

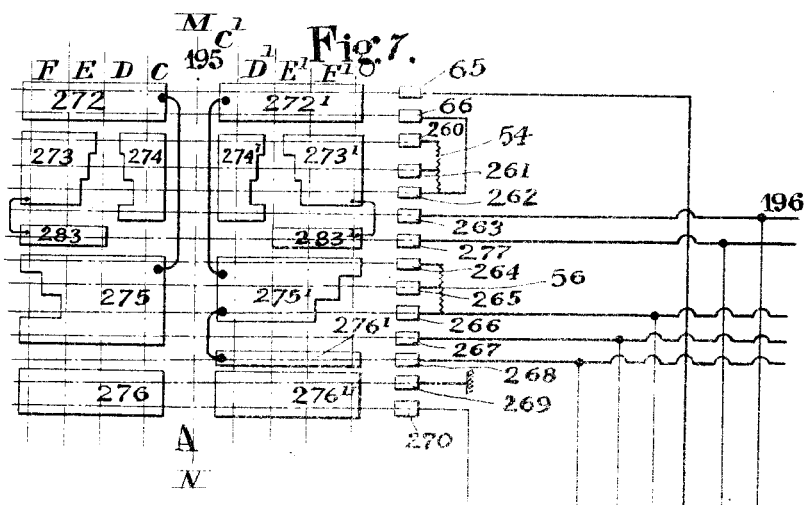
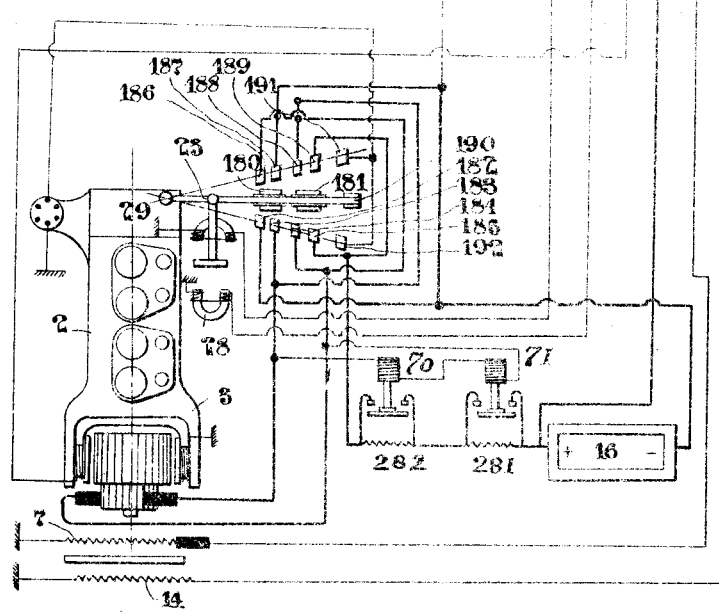

H. PIEPER.
APPARATUS FOR CONTROLLING MOTOR VEHICLES DRIVEN BY MIXED POWER.
APPLICATION FILED NOV. 27, 1909.
1,140,849.
Patented May 25, 1915.
11 SHEETS—SHEET 6.
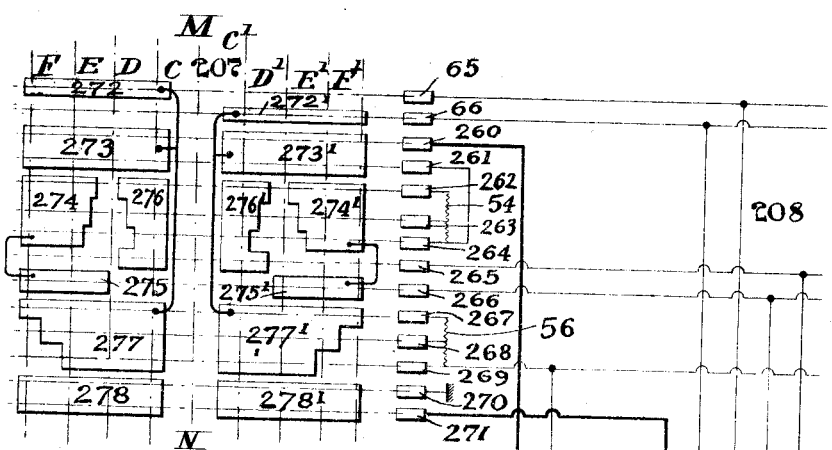
Fig. 8.
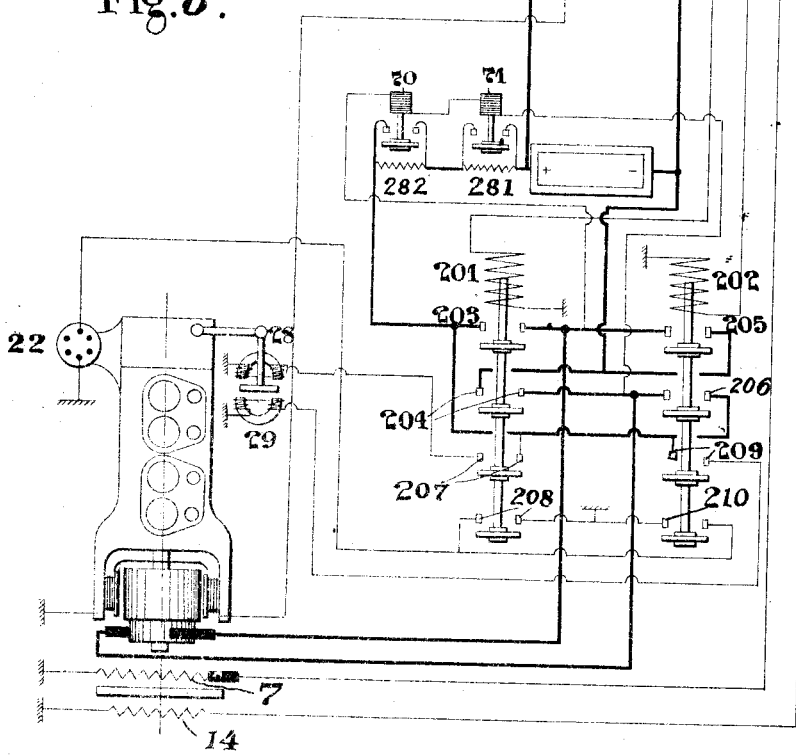

H. PIEPER.
APPARATUS FOR CONTROLLING MOTOR VEHICLES DRIVEN BY MIXED POWER.
APPLICATION FILED NOV. 27, 1909.

1,140,849.

Patented May 25, 1915.
11 SHEETS—SHEET 7.

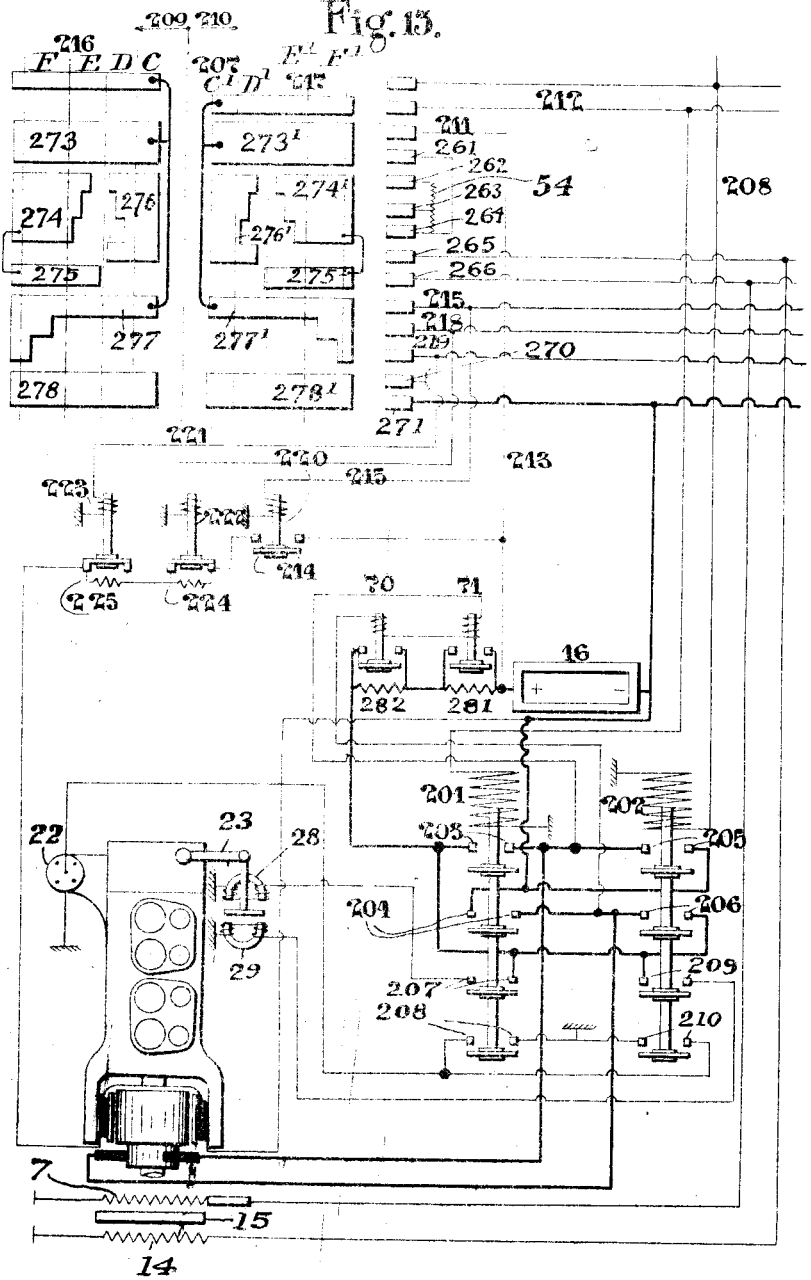

UNITED STATES PATENT OFFICE.

HENRI PIEPER, OF LIEGE, BELGIUM.

APPARATUS FOR CONTROLLING MOTOR-VEHICLES DRIVEN BY MIXED POWER.

1,140,849.  Specification of Letters Patent.  Patented May 25, 1915.

Application filed November 27, 1908. Serial No. 520,112.

*To all whom it may concern:*

Be it known that I, HENRI PIEPER, a subject of the King of Belgium, residing at 12 Avenue des Thermes, Liege, Belgium, have invented certain new and useful Improvements in Apparatus for Controlling Motor-Vehicles Driven by Mixed Power, of which the following is a specification.

This invention relates to improved apparatus for controlling motor vehicles driven by mixed power, such as those which run on rails.

Vehicles driven by mixed power receive their motion from an internal combustion motor, which is coupled to the wheels of the vehicle and is aided by a dynamo keyed on the same shaft. This dynamo which is connected in parallel with a storage battery, works either as a motor or as a generator, according to the tractive force to be overcome.

The particular arrangement of the group of motors permits of the control of the speed of the vehicle by acting on the excitation of the dynamo. Several successive equilibrium speeds can be determined for the latter, that is, several speeds for which the electromotive force of the armature is exactly equal to that of the battery. At such moments there is no current in the leads between the armature and the battery, and the internal combustion motor alone drives the vehicle. When such a speed is determined, that is when a condition of equilibrium between the dynamo and the battery has been produced, and when the internal combustion motor alone performs the drive, two cases may arise. *a.* The vehicle may slow down because a gradient or wind pressure has to be overcome. The electromotive force of the armature then at once becomes less than that of the battery, and a current arising from the battery, produces a turning moment in the electrical machine, which is added to that of the internal combustion motor in order to maintain the vehicle approximately within the limit of its determined speed. *b.* Conversely the vehicle may increase its speed when running downhill or when there is a tail wind. The electromotive force of the armature will then also increase and become greater than that of the battery. The electrical machine becomes a generator and charges the battery. The retarding moment which is produced in this manner likewise has the tendency to maintain the vehicle within the limits of its determined speed. The buffer action is in this case only secondary to the main motor action, which is normally delivered and is produced directly by the internal combustion motor. These vehicles differ essentially from electric vehicles, that is, from vehicles which are driven exclusively by purely electric motors coupled to the wheels, since in the former the electrical action is only an addition to the main action and generally remains zero for a normal speed. The current which arises in one direction or the other automatically influences, and in the same direction, the speed of the vehicle. In the second vehicle however, namely the electrical one, the electrical part is the main point. The electric motors constantly work as motors. The electric current is taken from a source which is independent of the driving wheels. Finally the control of the speed is effected only by changing the intensity of the current, and the turning moment at the wheels is always a function of this intensity.

The controlling and regulating means for vehicles with mixed power, although they may also be constructed in a purely electrical manner, differ completely from those which are used for driving and regulating purely electrical vehicles.

The present invention has now for object to provide improved apparatus for controlling the operation of one or more motor vehicles driven by mixed power, and it consists substantially in the combination of two or more points of control for the purpose of enabling the complete control of the vehicle or vehicles to be effected independently from any one of said points as desired.

Figure 2:
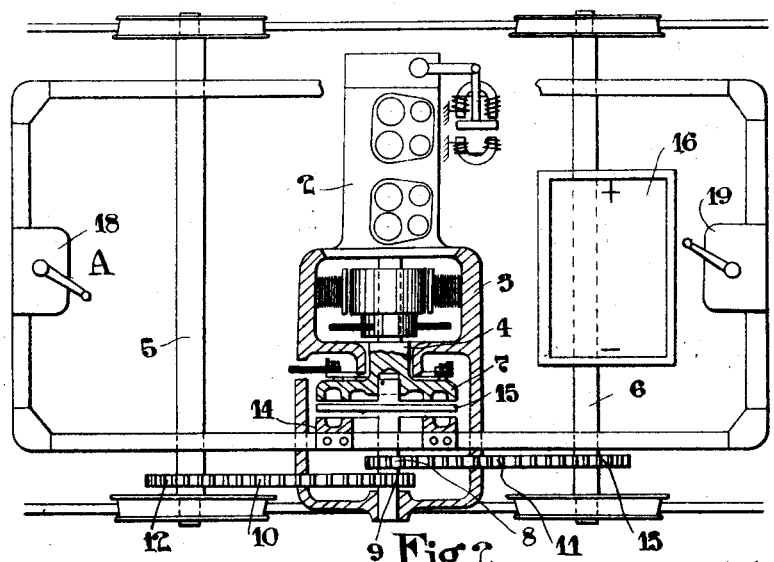
Figure 3:
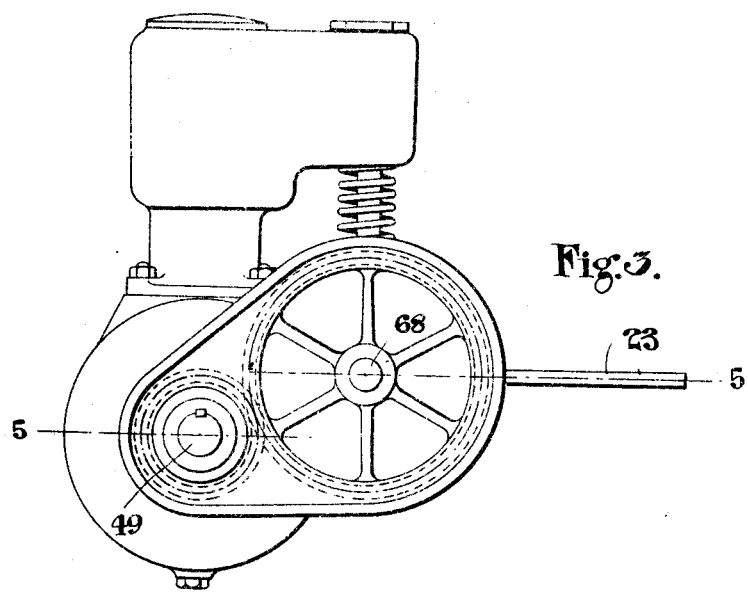
Figure 4:
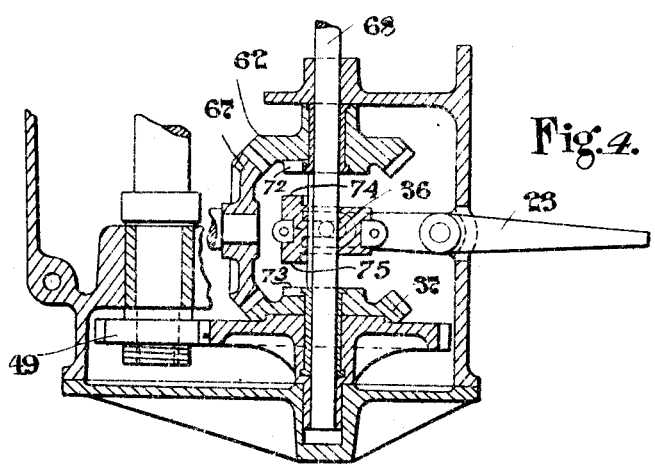
Figure 9:
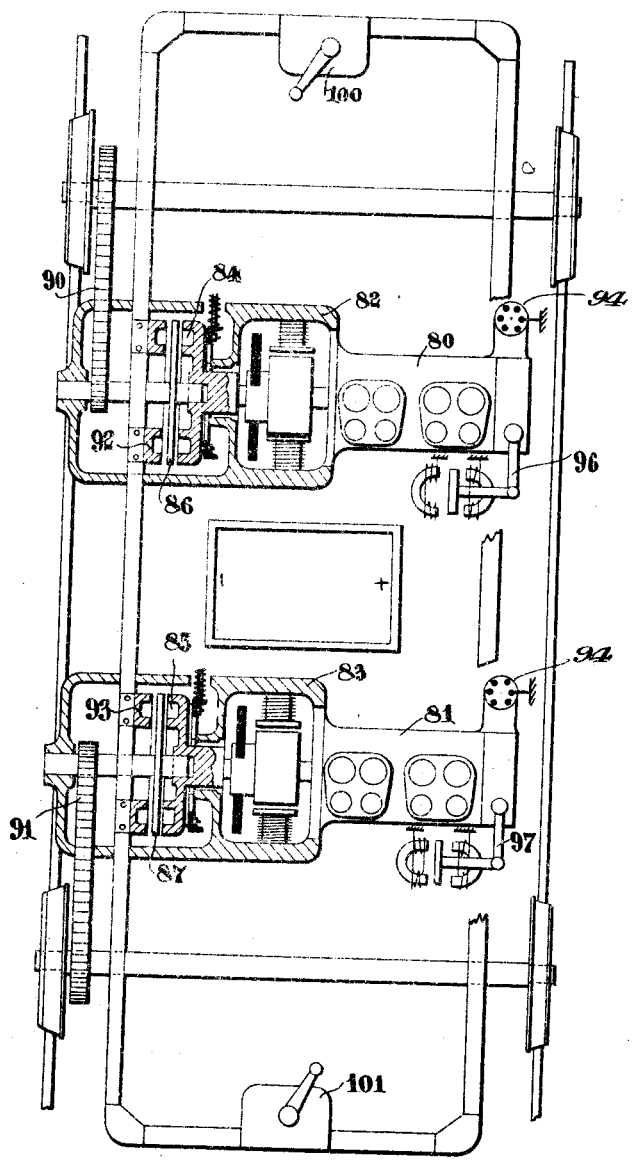
Figure 10:
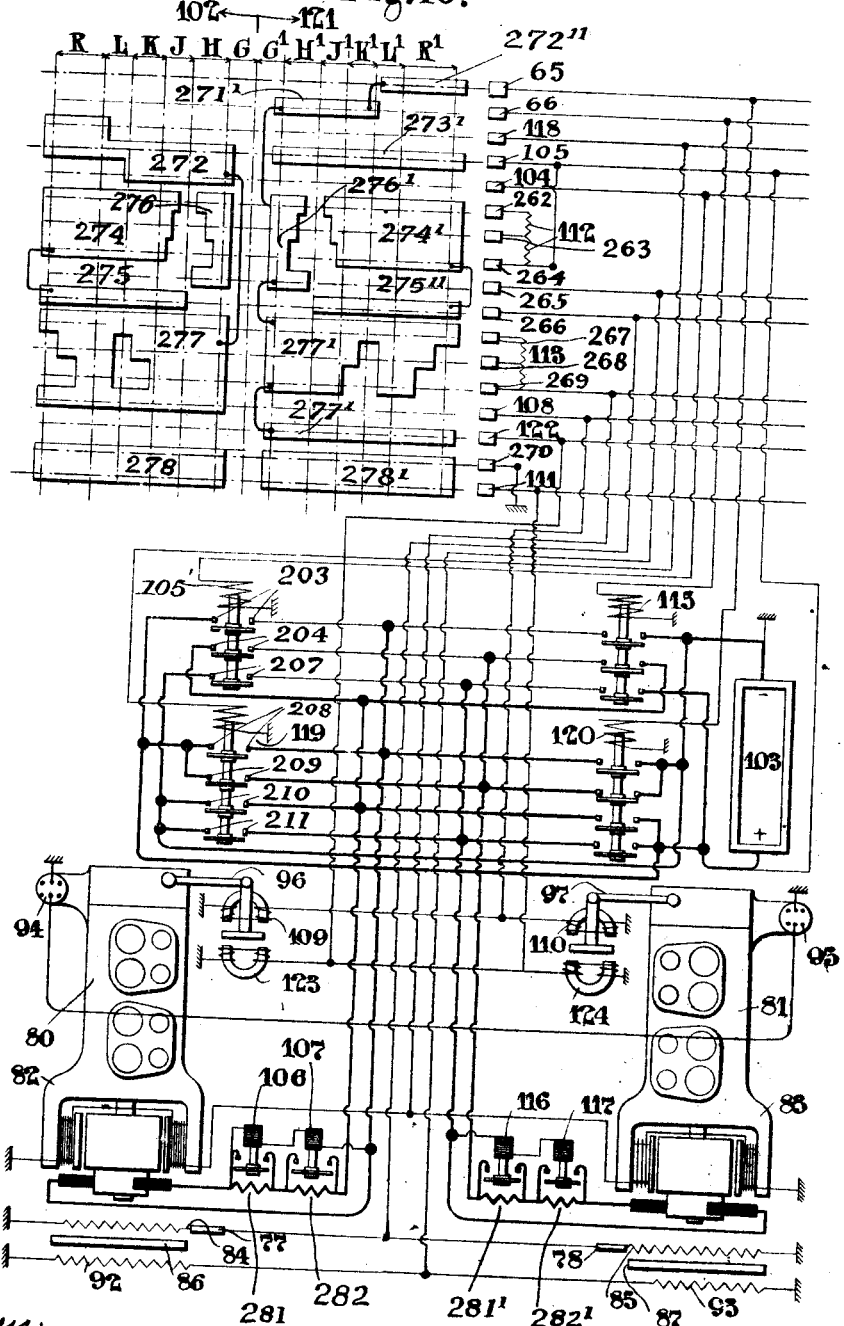
Figure 11:
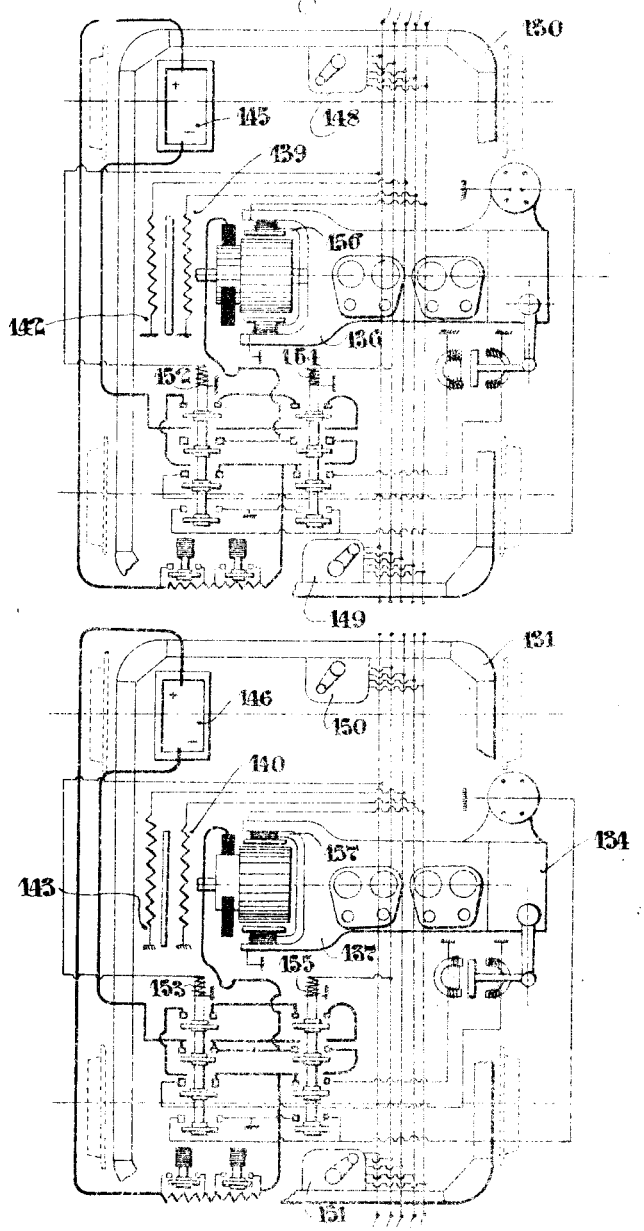
Figure 12:
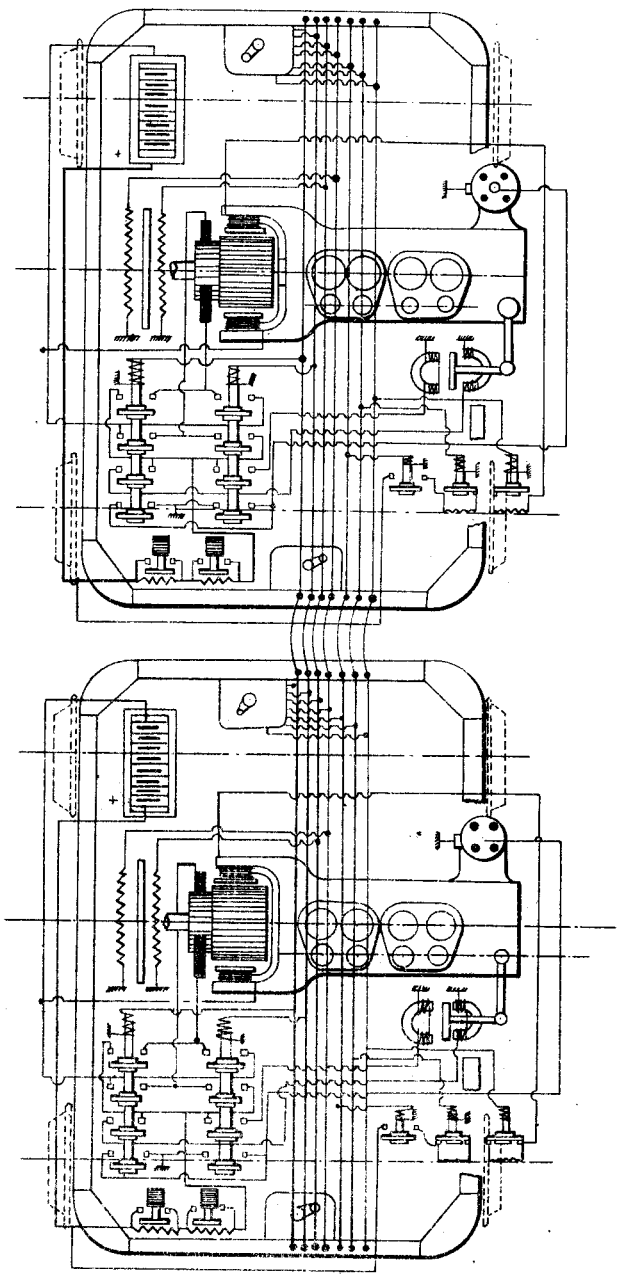

In the accompanying diagrammatic drawings: Figure 1 is a side elevation of motor vehicle driven by mixed power; Fig. 2 is a sectional plan thereof. Fig. 3 is a side elevation of the heat motor; Fig. 4 is a section on the line 5—5 of Fig. 4; Fig. 5 is a plan illustrating one phase of the connections between the points of control. Fig. 6 is a plan illustrating a modified arrangement of the electrical connections between the points of control. Fig. 7 is a plan illustrating a simplified arrangement of the electrical connections between the points of control. Fig. 8 is a plan illustrating a modification comprising five auxiliary leads. Fig. 9 is a sectional plan of a vehicle comprising two motor groups. Fig. 10 is a plan illustrating the electrical connections between the motor groups of Fig. 9. Fig. 11 is a plan illustrating a modified arrangement. Fig. 12 is a plan illustrating two motor vehicles coupled together according to this invention. Fig. 13 is a plan illustrating the apparatus on one of the two motor vehicles shown in Fig. 9.

Figs. 1 and 2 illustrate a vehicle such as a tramway car driven by mixed power which it is desired shall be capable of traveling in both directions without having to be turned around. In this vehicle an internal combustion engine 2 herein called a gas motor and electrical machine 3 connected thereto constitute a motor group the main shaft 4 of which acts upon the road wheel axles 5 and 6 by means of magnetic clutch 7 that drives the disk 4, the chain pinions 8 and 9, the driving chains 10, 11 and the chain wheels 12 and 13. Instead of the magnetic clutch shown, a mechanical clutch such as for instance a friction clutch, may be employed. Such a clutch is not indispensable for the operation of the vehicle, but it has the great advantage of enabling the electrical machine to run idly and thus be frequently and suddenly stopped and started, without having to stop and start the gas motor. Since this arrangement is very suitable for such vehicles a magnetic clutch is shown in all the figures:

14 is the coil of a magnetic brake consisting of a fixed rim facing the movable rim of the clutch 7; it is designed to act upon the disk 15 when the clutch 7 is not energized. 16 is a storage battery connected in parallel with the electrical machine 3.

The means by which the direction of motion of the gas motor may be reversed are shown in Figs. 3 and 4. A sliding clutch 36 rotates with valve controlling shaft 68 and is operated by lever 23 to engage with either of two bevel wheels 37 or 62, according as the valve controlling shaft 68 is required to rotate in the same direction or in the opposite direction relatively to the gas motor shaft. On the gas motor shaft is mounted the spur wheel 49, driving the train of bevel wheels 37, 67 and 62. The shaft of the valve controlling gear 63 thus rotates always in the same direction and the correct timing of the gas motor valves is assured for either direction of rotation of the gas motor, by providing the bevel wheels 37 and 62 with single clutch recesses 73 and 72 respectively with which projections 75 and 74 respectively suitably placed on the sliding clutch 36, are adapted to register.

Two points of control must be provided on such a vehicle; each point of control being understood to mean a group of all the various controlling devices, which are necessary for the control of vehicle, located on one and the same platform. For instance in Figs. 1 and 2 a single controlling device 18 is shown on platform A and a similar controlling device 19 is provided on the other platform B.

Fig. 5 illustrates the operations that take place in the several positions of one controller, the other controller on the car remaining in the neutral or inoperative position. When the said controller is moved from its neutral position in direction indicated by arrow 52, it passes successively into positions C, D, E, F, the resulting respective connections being as follows:

In position C, the current passes from the positive pole of the storage battery 16 to a fixed stud 234 on controller through contact piece 246 and thence divides, passing through four separate circuits: I. Through fixed studs 238 and 239, contact pieces 248, 249 fixed stud 244, brake coil 14 and back to negative pole of storage battery through earth. II. Through fixed stud 237 and field coils of the electrical machine and thence to earth and negative pole of storage battery 16. III. Through fixed stud 233 to the armature of the electrical machine, back through resistance to fixed stud 231, contact piece 245, fixed stud 230 to negative pole of storage battery 16. IV. Through contact piece 251, fixed stud 59, coils 28 and back to negative pole of storage battery 16 through earth. A connection is made between fixed studs 53 and 252 by contact piece 250 thereby completing circuit of the ignition device 22 and causing same to operate.

The electrical machine starts as a motor under reduced current, thus rotates the gas motor 2 in a forward direction, which since the lever 23 is moved into the "forward" position, by the attraction of the armature 27 by coil 28, starts up and assists the rotation of the electrical machine. The wheels of the vehicle are locked by the brake 15 since the coil 14 is energized. The gas motor now runs up speed of electrical machine and latter acts as a generator supplying current to storage battery 16.

In position D, the current passes from positive pole of storage battery 16 to fixed stud 234 on controller, contact piece 246, from here the current returns by path: I. Through fixed stud 233, armature of electrical machine, fixed stud 232, contact piece 245, and back to negative pole of storage battery 16, from stud 230. The circuits of armature field coils and the valve distribution gear remain unaltered. II. Through fixed studs 238, that portion of resistance 54 which lies between fixed studs 238 and 240, contact pieces 248 and 249, fixed stud 244, brake coil 14 and back to negative pole of storage battery 16 through earth.

The gas motor is still driving the electrical machine as a generator whose field is supplied as above, the latter supplying current to the storage battery 16; but as the controller moves over position D resistance is introduced in the brake coil circuit. Thus the brake is gradually removed as contact piece 248 passes out of contact with the fixed studs 240, 241, 242, and is finally free when the contact piece 249 breaks contact with fixed stud 244.

In position E, the current passes from positive pole of storage battery 16 to fixed stud 234, contact piece 246. From here the current divides and returns by path: Through fixed stud 238, a portion of resistance 54 and then fixed studs 241, 240, 239 (each in succession) contact piece 247, fixed stud 243, clutch coil 7 and back to negative pole of battery through earth. The circuits of the armature, field coils and valve distribution gear remain unaltered. The ignition device 22 operates as before.

Since the clutch coil 7 is now gradually energized and the motion of the electrical machine and gas motor, to which latter is coupled, is transmitted to the driving wheels.

As the gas motor slackens speed slightly on account of load the electrical machine assists the former by acting as a motor and receiving energy from the storage battery 16. Thus the speed of the motor set tends to remain constant.

In position F, the current passes from the positive pole of the storage battery 16 to fixed stud 234, contact piece 246. From here the current returns by path: Through fixed stud 235, 236 or 237 (each in succession) a portion of resistance 56, field coils of electrical machine 3, and back to negative pole of storage battery 16 through earth. The circuits of the armature, clutch coils and valve distribution gear remain unaltered. The ignition device 22 operates as before.

The speed of the vehicle is increased by the weakening of the excitation of the electrical machine by the gradual insertion of resistance in field circuit, as above described.

On returning the controller to its dead center as by arrow 57 the above cycle of operation is reversed.

When the controller is operated from its inoperative position in the reverse direction, viz., that indicated by arrow 57, it passes successively into positions C', D', E', F', the resulting respective connections being as follows:

In position C' the current passes from the positive pole of the storage battery 16 to a fixed stud 234 through contact piece 246' and then divides, passing through four separate circuits: I. Through fixed studs 238, 239 contact piece 247', 249', fixed stud 244, brake coil 14 and back to negative pole of storage battery 16 through earth. II. Through fixed stud 237, field coils of electrical machine 3 in same direction as previously, and back to negative pole of storage battery 16 through earth. III. Through to contact piece 245', fixed stud 231, resistance and through armature of electrical machine 3 in reverse direction to that obtaining previously and back to negative pole of storage battery 16 through fixed stud 233, contact pieces 246'', 245', and fixed stud 230. IV. Through to contact piece 251', fixed stud 58, coils 29 and back to negative pole of storage battery 16 through earth. The circuit of the ignition device 22 is closed through fixed stud 52, contact piece 250', fixed stud 151 and earth.

The electrical machine 3 now runs as a motor in the reverse direction to previous, because of the reversed connections to its brushes, as above described. The gas motor is thus rotated in the reverse direction to its previous, and, since the lever 22 now stands in the "reverse" position, being placed there by armature of which is actuated by coil 29, the gas motor now starts up and assists the rotation of the electrical machine 3.

Meanwhile the brake coil 14 is fully energized as above described.

The circuit resulting from the remaining controller positions are exactly similar to those explained with reference to the "forward" running, except in that the lever 23 now stands in the "reverse" position. All the corresponding brushes of the two controllers, one of which is omitted in Fig. 5, are connected together and all the circuits are open in the mid-position M N (Fig. 5). If one of the levers is left in this position the vehicle may be controlled by means of the other regulator.

Fig. 5 shows a system of control in which the apparatus employed therefore are operated directly from the main current. In the case of large vehicles it is however advantageous to effect the closing and opening of the main circuits by means of electric relays for the purpose of avoiding too large contacts, heavy and expensive cables, and sparking when cutting off the current. Fig. 6 shows an arrangement of this kind for the vehicle shown in Figs. 1 and 2.

60 is a controlling apparatus which is intended to perform the same function as the apparatus shown in Fig. 5, and which is combined through the medium of the conductors 61 with a similar apparatus (not shown). By means of the connecting wires of the same movements of the lever which are carried out by the one apparatus at the one point of control, can be effected in the same manner in the other apparatus.

In Fig. 7 the closing of the "main circuit" between the electrical machine 3 and the storage battery 16 is effected by means of the main relay 63 for forward travel and by means of the main relay 64 for backward travel.

The "auxiliary circuit" for operating the relay 63 is: From the positive pole of the storage battery 16 to fixed stud 260, contact pieces 272″, 272′, fixed stud, 65, and through the energizing coil of relay to earth, returning to the negative pole of the storage battery through fixed stud 270, contact piece, 276″, and fixed stud 53. The "auxiliary circuit" of the relay 64 is similar.

The zero position is represented by M N in Fig. 6. When the controller is moved so as to occupy position c the following circuits are established. I. From the positive pole of the storage battery 16 to the fixed stud 263, contact piece 274, fixed stud 264, brake coil 14 and back to negative pole of storage battery 16 through earth. II. From the positive pole of the storage battery 16 to fixed stud 260, contact pieces 272 and 275, fixed stud 268, field coils of the electrical machine 3 and back to negative pole of storage battery 16. III. From the positive pole of a storage battery 16 to fixed studs 260, contact piece 272, fixed stud 66, main relay coil 64 and back to the negative pole of the storage battery 16 through earth. IV. From the positive pole of the storage battery 16 to fixed stud 260, contact pieces 272 and 275, fixed stud 269, coils 29 and back to negative pole of storage battery through earth. V. The circuit of the ignition device 22 is closed through fixed stud 53, contact piece 276, fixed stud 270 and earth.

The return path of current from earth to the negative pole of the storage battery 16 is through fixed stud 270, contact piece 276 and fixed stud 271, in each case with reference to Fig. 6.

The plunger of the relay 64 is thus raised, closing contacts 277, 278 and 279 to 280. The current now flows in addition from the positive pole of battery through resistances 281 and 282, contact 279 to contact 280 where it divides and part passes through relays 70 and 71 in series, and to contact 278 and the main portion passes through armature of electrical machine to contact 278. The current reunites at contact 278 and returns through contact 277 to the negative pole of the battery 16.

The electrical machine now starts up as a motor automatically, the field being constantly excited and the armature current of increasing value being supplied through automatic relays 70 and 71, as above described. Also the gas motor starts up and assists the rotation of the electrical machine, the valve controlling gear being suitably set by lever 23 as above described. The brake is fully applied to the vehicle wheels.

In position D, current passes: From the positive pole of the storage battery 16 to fixed studs 261, 262 and 263 (each in turn) through increasing amounts of resistance 54, contact piece 274, fixed stud 264, brake coil 14 and back to the negative pole of storage battery 16 through earth. The respective circuits are thus the same as in position "C" except that the excitation of the brake coil is reduced step by step, as above described. The brake is accordingly released.

In position E, current passes: From the positive pole of the storage battery 16 of the fixed stud 261, 262, or 263 (each in turn) through decreasing amounts of resistance 54, contact pieces 273, 283, fixed stud 265 clutch coil 7 and back to the negative pole of storage battery 16 through earth.

The respective circuits are the same as those for position "D" except that the excitation of the clutch coil is increased, step by step, by supply of current as above described through contact 55. The speed of the gas motor accordingly falls as the load of the starting vehicle is applied through the clutch, but immediately the electrical machine acts as a motor assisting the rotation of the gas motor, until the speed of the vehicle becomes constant and the gas motor drives the electrical machine as a generator as before.

In position F, the maximum speed of the vehicle is attained by weakening the field of the electrical machine, the field circuit now being as follows: From the positive pole of the storage battery 16 to fixed stud 260, contact pieces 272, 275, fixed stud 266, resistance 56, field coils of electrical machine and back to the negative pole of the storage battery through earth. All the remaining circuits remain unchanged For operating the vehicle in the reverse direction, the controller is moved into positions C′ D′ E′ F′ operating relay 63 in place of relay 64, and coils 28 instead of coils 29 to move the valve controlling gear lever 23 into the opposite position to its previous one.

Fig. 7 shows an arrangement such as is employed for the vehicle shown in Figs. 1 and 2 in which simpler connections are used. In this arrangement the coils 28 and 29 are utilized to perform the functions of the coils 63 and 64 in Fig. 6. For this purpose the lever 23 carries two contacts 180 and 181 which close the circuits of the brushes 182 and 183, 184 and 185 when coil 28 is energized that is for forward travel, and which close the circuits of the brushes 186, 187 and 188, 189 when the coil 29 is energized that is for backward travel. The lever 23 carries a further contact 190 which closes the circuit of the ignition device 22 by means of brushes 191, 192.

The necessary operations for forward travel and the various circuits resulting therefrom are as follows:

The controller at A is moved to occupy position "C" and current passes. I. Through series resistances 281 and 282 to brush 185 contact 181, brush 184 and divides, some, the main part, passing through the armature of the electrical machine 3, brushes 183, contact 180, brush 182, and back to the negative pole of the storage battery 16; the remainder passing through two relay coils 70 and 71 in series to brush 182 whence it returns to the negative pole of the storage battery 16 by same path as the bulk of current. II. To fixed stud 65, through contact piece 272, fixed stud 66, to fixed stud 262, contact piece 274, fixed stud 263, brake coil 14 and back to the negative pole of the storage battery 16 through earth. III. To fixed stud 65, through contact pieces 272, 275, fixed stud 266, field coils of the electrical machine 3 and back to the negative pole of the storage battery through earth. IV. To fixed stud 65, through contact pieces 272, 275, fixed stud 267, coil 93 and back to the negative pole of the storage battery 16 through earth. The circuit of the ignition device 22 is closed through brush 192, contact 190 and earth through the lever 23. The return path of current from earth to the negative pole of the storage battery 16 is through fixed stud 269, contact piece 276 and fixed stud 270, in each case with reference to Fig. 7.

The electrical machine starts gradually as a motor under full excitation, the main current through armature being increased as resistances 282 and 281 are cut out of action by relays 70 and 71 respectively. The gas motor is wound and gradually starts up, the ignition device being set to operate and the valve controlling gas being suitably set by lever 23 as above described.

In position D, the current passes from the positive pole of the storage battery 16: I. Through the now short circuited resistances 281 and 282 to brush 185, contacts 181, brush 184, armature of the electrical machine 3 and divides as before. II. To the fixed stud 65 through contact piece 272, fixed stud 66, to fixed stud 262 or 261 or 260 (each in succession) through increasing amounts of resistance 54, contact piece 274, fixed stud 263, brake coil 14 and back to the negative pole of the storage battery 16 through earth. The remaining circuits are unaltered.

The gas motor is now driving the electrical machine 3 as a generator, which supplies the storage battery 16 with current and the brakes are gradually released as above described. The vehicle is still at rest.

In position E, current passes from the positive pole of the storage battery 16: To the fixed stud 65, through contact piece 272, fixed stud 66, to fixed stud 262, or 261 or 260 (each in turn) through decreasing amounts of resistance 54, contact pieces 275, 283, fixed stud 277, clutch coil 7 and back to the negative pole of the storage battery 16 through earth.

The other circuits remain unaltered. The gas motor now accelerates the vehicle, and is assisted by the electrical machine, which acts as a motor until the vehicle has got up speed. The gas motor finally drives the vehicle and the electrical machine as a generator.

In position F, the current passes from the positive pole of the storage battery 16: To fixed stud 65 through contact pieces 272, 275, fixed studs 266 or 265 or 264 (each in turn) increasing amounts of resistance 56 and back to the negative pole of the storage battery through the field coils of the electrical machine 3. To the fixed stud 65, through contact piece 272, fixed studs 66, 262, contact pieces 275, 283 fixed stud 277, clutch coil 7 and back to the negative pole of the storage battery 16 through earth. The other circuits remain unaltered. The speed of the vehicle now attains a maximum owing to the reduction of the load on the gas motor of the electrical machine running as a generator by reducing the field excitation of the latter. For operating the vehicle in the backward direction the controller positions C', D', E', and F' are used. Fig. 8 shows an arrangement such as is employed for the vehicle shown in Figs. 1 and 2 in which simpler connections are used. In this arrangement the relays 201 and 202 are analogous to and arranged in same manner as the relays 63 and 64 in Fig. 6.

The necessary operations for forward travel and the various circuits resulting therefrom are as follows:

The controller 207 is moved to occupy position "C" and current passes from the positive pole of the storage battery 16: I. To fixed stud 209, contact pieces 273, 272, fixed stud 65, through relay coil 202 and back to the negative pole of the storage battery 16, through earth and fixed studs 270, 271 and contact piece 278. The relay 202 now picks up its armature and the further circuits established are: II. From the positive pole of the storage battery 16 through series resistances 281 and 282, contacts 209, coils 29 and back to the negative pole of the storage battery 16 through earth and fixed studs 270, 271 and contact piece 278. III. From the positive pole of the storage battery 16 through series resistances 281, 282, contacts 206, armature of electrical machine 3, contacts 205 and to the negative pole of the storage battery. IV. From the positive pole of the storage battery 16 through series resistances 281, 282, contacts 206, relay coils 71, 70, contacts 205 and back to the negative pole of the storage battery. Relays 71 and 70 now pick up their respective armatures thereby short-circuiting the series resistances 281 and 282. V. From the positive pole of the storage battery 16 to fixed stud 260, through contact piece 273, fixed studs 261, 264, contact piece 276, fixed stud 265, brake coil 14 and back to the negative pole of the storage battery 16 through earth, fixed studs 270, 271 and contact piece 278. VI. From the positive pole of the storage battery 16 to fixed stud 260 through contact piece 273, 277, fixed stud 269, field coils of electrical machine and back to the negative pole of the storage battery 16 through earth, fixed contacts 270 and 271 and contact piece 278. VII. The circuit of the ignition device 22 is closed through contacts 210 and earth.

The electrical machine starts up gradually as a motor from the battery 16 and rotates the gas motor, which accordingly starts up, the valve gear lever 23 being suitably set and the ignition device set in action as above described.

In position D, the relays 202, 70 and 71 remain energized as before and the only altered circuit is:—From the positive pole of the storage battery 16 to the fixed stud, 260, contact piece 273, fixed stud 261 to fixed stud 264 or 263 or 262 through decreasing amounts of resistance 54, contact pieces 276, fixed stud 265, brake coil 14, back to the negative pole of the storage battery through earth, fixed studs 270, 271, and contact piece 278.

The electrical machine is now driven as a generator by the gas motor, as before, and the brakes on the transmission gear are gradually removed as above described.

In position E, the relay coils 70, 71, and 202 remain energized as before, and the only altered circuit resulting therefrom is as follows:—From the positive pole of the storage battery 16 to the fixed stud 260, contact piece 273, fixed stud 261 to fixed stud 262 or 263 or 264, through decreasing amounts of resistance 54, contact pieces 274, 275, fixed stud 266, clutch coil 7 and back to the negative pole of the storage battery 16 through earth, fixed studs 270, 271, and contact piece 278.

The gas motor commences to drive the vehicle, being helped by the electrical machine now acting as a motor. The vehicle increases in speed and the gas motor once more drives the electrical machine as a generator.

In position F, the speed is further increased by the reduction of the excitation of the field windings of the electrical machine with a resulting decreasing load on the gas motor, the altered field circuit being as follows:—Current passes from the positive pole of the storage battery 16 to the fixed stud 260, through contact pieces 273, 277, fixed stud 269 or 268 or 267 (each in succession) through increasing amounts of resistance 54, field coils of electrical machine and back to the negative pole of the storage battery through earth, fixed studs 270, 271 and contact piece 278.

For operating the vehicle in the opposite direction the contacts C' D' E' and F' are employed, relay 201 then being operated in a similar manner as relay 202, described above.

Figs. 10 and 11 illustrate the case of a vehicle provided with two motor groups either for producing more power, or for providing a greater graduation of speed, because the variation of the speed of the electrical machine may be effected by combining the variation of the excitation with the well known series parallel connection of the armatures. 80 and 81 are the gas motors coupled to the electrical machine 82 and 83. The magnetic clutches 84 and 85 mounted on the ends of the common shafts carry with them, the disks 86 and 87 that are connected to the road wheel axles by means of chains 90 and 91. The fixed magnet iron pieces 92 and 93 form with the disks 86 and 87 a brake as before. The two gas motors have respectively ignition devices 94 and 95 and reversing levers 96 and 97, all the same as before. The two points of control have respective identical regulators 100 and 101, the steps of which are combined symmetrically with each other.

The various phases of the manipulations are indicated by the arrows and angles in Fig. 11.

On moving the controller in the direction of the arrow 102, then:—In position G, current passes from the positive pole of the storage battery 103. (1) To the fixed stud 105, through contact piece, 272, fixed stud 104, relay coil $105^1$ and back to the negative pole of the storage battery 103, through earth. II. To the fixed stud 105, through contact pieces 272, 277, fixed stud 269, field coils of the two electrical machines in parallel and back to the negative pole of the storage battery 103 through earth. III. To the fixed stud 105, through contact pieces 272, 277, fixed stud, 108, coils 109, 110 of the two electrical machines.

The relay $105^1$ now picks up and, then:— IV. Current passes from the positive pole of the storage battery 103, through contacts 203, the armature of the electrical machine 82, through series resistances 281 and 282, at first, until the current tapped in parallel from brushes of armature operates relays 106 and 107, and then the main armature current passes direct through contacts 204, to the series resistances $281^1$ and $282^1$, which are short-circuited by the relays 116 and 117 respectively. These two relay coils are energized by being placed in parallel with brushes of electrical machine 83, just as coils 106 and 107 were placed in parallel with brushes of electrical machine 82. V. Current passes from the positive pole of the storage battery 103 to fixed stud 264, contact piece 276, fixed stud 265, through both brake coils 92 and 93 in parallel and back to the negative pole of the storage battery 103 through earth. The current now passes through the armature of the electrical machine 82 and back to the negative pole of the storage battery 103 through contacts 217. The circuits of both ignition devices 94 and 95 are closed through earth, fixed studs 270, 111, and contact piece 278.

The two electrical machines 82 and 83 are thus started in series, with full parallel field excitation and revolve their respective gas motors 80 and 81. The latter now start up, since their respective ignition devices 94 and 95 are set in action; and their respective valve controlling levers 96 and 97 are suitably set by coils 109 and 110, as above described. The gas motors both run up the speed of the electrical machines 82 and 83 until these run as generators, supplying current back to the storage battery 103.

In position H, the various circuits are the same as the above, except that:—The current now passes from the positive pole of the storage battery 103 to contact piece 276 through increasing amounts of resistance 112, whence it passes through fixed stud 265, and brake coils 92 and 93 to the negative pole of the storage battery 103, through earth.

The electrical machines are still driven as generators supplying current to the storage battery 103 and the brakes are removed. The vehicle is still at rest.

In position J, the various circuits are the same as the above, except that:—The current now passes from the positive pole of the storage battery 103, through decreasing amounts of resistance 112 to contact piece 274, through fixed stud 266 and back to the negative pole of the storage battery through two clutch coils 84 and 85 in parallel, and earth.

The clutches are gradually applied and the gas motor, assisted by the electrical machines now acting as motors, accelerates the vehicle, which attains a certain definite speed.

In position K, the circuits are identical with those above, except that:—Current passes from the positive pole of the storage battery 103, through fixed stud 105, contact piece 272 to contact piece 277, through fixed stud 269, 268, and 267, in turn and increasing portions of resistance 118 and back to the negative pole of the storage battery 103, through both field coils in parallel.

The vehicle is now driven at a faster rate by the reduction of excitation of the electrical machines running in parallel as generators.

In position L, the circuits are identical with those above, except that:—Current from the positive pole of the storage battery 103, passes to the fixed stud 105, contact piece 272 and instead of passing through fixed stud 104 and coil of relay 105 to earth, the current now passes through contact piece 118 and coil of relay 119 and back to the negative pole of the storage battery 103 through earth. The relay 105 drops and 119 picks up, the current now passing:—I. From the positive pole of the storage battery 103, through fixed stud 105, contact pieces 272, 277, fixed stud, 269, and back to the negative pole of the storage battery 103, through the field coils of the two electric machines in parallel, and earth. II. From the positive pole of the storage battery 103, through fixed stud 105, contact pieces 272, 277, fixed stud 108 and back to the negative pole of the storage battery through coils 109 and 110 and earth. III. From the positive pole of the storage battery 103, through fixed stud 264, contact pieces 274, 275, fixed stud 266 and back to the negative pole of the storage battery 103, through two clutch coils 84 and 85 in parallel, and earth. IV. From the positive pole of the storage battery through contacts 208 (now bridged by an armature contact of relay 119), armature of electrical machine 82 and series relay coils 106, 107, series resistances 281 and 282 (which are immediately short-circuited by the relays 106 and 107), contacts 210, and back to the negative pole of the storage battery 103. V. From the positive pole of the storage battery through contacts 209 (now bridged by an armature contact of relay 119), armature of electrical machine 83 and series relay coils 116, 117, series resistances 281 and 282 (which are immediately short-circuited by the relays 116 and 117), contacts 211 and back to the negative pole of the storage battery 103.

The ignition device operates as previously.

The two electrical machines and their respective field windings are now connected in parallel with the storage battery and are driven at full excitation, by their respective gas motors, which are also propelling the vehicle.

In position R, the speed of the vehicle may be further reduced by reducing the excitation of the two electrical machines, thus:—The current passes from the positive pole of the storage battery 103 to the fixed stud 105, through contact pieces 272, 277, a portion, or all, of resistance 118, fixed stud 269, and back to the negative pole of the storage battery 103 through the two field windings in parallel, and earth. On returning the controller to neutral position the above operations are performed in the reverse order.

For propelling the vehicle in the opposite direction to that in the above case, the positions G¹, H¹, J¹, K¹, L¹, R¹ are used, the relays 115 and 120 being then operated for the reverse connections of the armatures of the two electrical machines with the storage battery.

Fig. 12 shows an application of the arrangement to the relays of Fig. 9, for the case where a plurality of vehicles, each having its own mixed power group running on the same line of rails are formed into a train which can be controlled from any desired point.

For the sake of simplicity two vehicles 130 and 131 are selected for description having a motor group, that is the gas motors 133 and 134 are coupled respectively to electrical machines 136, 137 and drive the wheels by means of clutches 139, 140. The brakes 142 and 143 are arranged symmetrically to the clutches. Each vehicle carries its storage battery 145, 146 two regulators 148, 149 and 150, 151 and five leads extending across from one end to the other of the vehicle, the return being constituted by the body of the vehicle and the rail. These five leads extend from each vehicle to the other and terminate as follows: (1) In the main relays for forward travel 152 and 153, (2) in the main relays 154 and 155 for backward travel, (3) in the field exciting coils 156 and 157 of the electrical machines, (4) in the clutches 139 and 140, (5) in the brakes 142 and 143.

The train can be controlled from any desired point provided that the levers at the other points are on their dead centers.

In the case where a train is composed of a plurality of high powered motor vehicles, it might happen that the exciting currents of the several electrical machines would be considerable. In existing arrangements the exciting coils of the several machines are branched off in parallel, and all of them are fed through the battery of the vehicle at the head of the train where the manipulations are performed.

In order to prevent the battery at the point of control having to supply excessive currents, the excitation of each electrical machine may be effected by means of its storage battery on the respective vehicle. The regulation of the exciting currents is effected however by means of relays or auxiliary motors which act simultaneously and synchronously upon the vehicles. An arrangement of this kind is illustrated in Fig. 13 which shows two vehicles, Fig. 14 showing the diagram of connections for one of these vehicles.

The necessary operations and the various circuits resulting therefrom, are as follows: The controller 207 is moved so as to occupy position "C." and current then passes from the positive pole of the storage battery 16:—

1. To fixed stud 211, through contact pieces 273, 216, fixed stud 65, relay coil 202 and back to the negative pole of the storage battery 16 through earth, fixed studs 270 and 271 and contact piece 278. The relay 202 now picks up its armature. II. To fixed stud 211, contact piece 273, fixed stud 261 to fixed stud 265, through contact piece 276, fixed stud 265, brake coil 14 and back to the negative pole of the storage battery 16 through earth. III. To fixed stud 211, through contact pieces 273, 277, fixed stud 215 and relay coil 220, and back to the negative pole of the storage battery 16 through earth, fixed studs 270 and 271 and contact piece 278. The relay 220 now picks up its armature, thus bridging contacts 214. IV. Through series resistances 281, 282, contacts 206, through the armature of the electrical machine, contacts 205 and back to the negative pole of the storage battery 16. V. Through series resistances 281, 282, contacts 206, through both relay coils 70 and 71 in series, contacts 205 and back to the negative pole of the storage battery 16. The relays 70 and 71 now pick up and short-circuit the resistances 281 and 282. VI. Through the now short-circuited resistances 281 and 282, contacts 209, coils 29 and back to the negative pole of the storage battery 16 through earth, fixed studs 270, 271, and contact piece 278. VII. Through bridged contacts 214, series resistances 224, 225, field coils of the electrical machine and direct to the negative pole of the storage battery 16. The circuit of the ignition device 22 is closed through contacts 210 and earth.

The electrical machine now starts gradually as a motor and rotates the gas motor, which accordingly starts up, the valve lever 23 being suitably set, and the ignition device being set in action. The gas motor then runs the electrical machine as a generator supplying current to the storage battery 16.

The controller 207 is now moved to occupy position D and current passes from the positive pole of the storage battery 16: I. To fixed stud 211, through contact pieces 273, 216, fixed stud 65, relay coil 202 and back to the negative pole of the storage battery 16 through earth, fixed studs 270, 271, and contact piece 278. II. To fixed stud 211, through contact piece 273, fixed stud 261, increasing portions of resistance 54, fixed stud 264, 263 or 262 (each in succession), contact piece 276, fixed stud 265, brake coil 14, and back to the negative pole of the storage battery through earth, fixed studs 270, 271, and contact piece 278. III. To fixed stud 211, through contact pieces 273, 277, fixed stud 215, relay coil 220 and back to the negative pole of the storage battery 16 through earth, fixed studs 270, 271 and contact piece 278. IV. Through contacts of relays 71, 70, (bridging the resistances 281, 282), contacts 209, coils 29 and back to the negative pole of the storage battery 16 through earth, fixed studs 270, 271, and contact piece 278. V. Through contacts of relays 71, 70, (bridging the resistances 281, 282), through contacts 206, armature of electrical machine, contacts 205 and back to the negative pole of the storage battery 16. VI. Through contacts of relay 71, 70 (bridging the resistances 281, 282) through contacts 206, relay coils 70 and 71 in series, contacts 205 and back to the negative pole of the storage battery 16. VII. Through bridged contacts 214, series resistances 224, 225, field coils of the electrical machine and direct to the negative pole of the storage battery 16. The circuit of the ignition device 22 is closed through contacts 210 and earth, as before.

The gas motor is now driving the electrical machine as a generator, as before. The brakes are gradually removed by the reduction in the excitation of the brake coil 14 as above described.

The controller is now moved to occupy position E and current passes from the positive pole of the storage battery 16:—I. To fixed stud 211, through contact pieces 273, 216, fixed stud 65, relay coil 202 and back to the negative pole of the storage battery 16 through earth, fixed studs 270, 271, and contact piece 278. II. To fixed stud 211, through contact piece 273 fixed stud 261, decreasing portions of resistance 54 and fixed studs 262, 263 or 264 (each in succession), contact pieces 274, 275, fixed stud 266, clutch coil 7 and back to the negative pole of the storage battery 16 through earth, fixed studs 270, 271, and contact piece 278. III. To fixed stud 211, through contact pieces 273, 277, fixed stud 215, relay coil 220 and back to the negative pole of the storage battery 16 through earth, fixed studs 270, 271, and contact piece 278. IV. Through contacts of relays 71 and 70, (bridging the resistances 281 and 282), contacts 209, coils 29 and back to the negative pole of the storage battery 16 through earth, fixed studs 270 and 271 and contact piece 278. V. Through contacts of relays 71 and 70 (bridging the resistances 281, 282), through contacts 206, armature of the electrical machine, contacts 205 and back to the negative pole of the storage battery 16. VI. Through contacts of relays 71, 70 (bridging the resistances 281, 282) through contacts 206, relay coils 70 and 71, in series, contacts 205 and back to the negative pole of the storage battery 16. VII. Through bridged contacts 214, series resistances 224, 225, field coils of the electrical machine and direct to the negative pole of the storage battery 16.

The circuit of the ignition device 22 is, as before, closed through contacts 210 and earth. The gas motor accelerates the vehicle being helped by the electrical machine acting as a motor. The clutch is fully applied and the vehicle settles down to a steady speed and the electrical machine once more acts as a generator supplying current to the storage battery 16.

The speed is further increased to a maximum by the reduction of the field excitation of the electrical machine thus: The controller is placed in position F and all the above circuits remain unaltered except that of the field coils of the electrical machine. The current passes from the positive pole of the storage battery to the fixed stud 211, through contact pieces 273, 277, and back to the negative pole of the storage battery through field coils of the electrical machine by first one, then two, and then three parallel paths, viz:—(i) Fixed stud 215, relay coil 220. (ii) Fixed stud 215, relay coil 220; and, fixed stud 218, relay coil 222. (iii) Fixed stud 215, relay coil 220; and fixed stud 218, relay coil 222; and fixed stud 219, relay coil 223. The effect of this is the progressive insertion of resistance in the field circuit with the result that the field excitation of the electrical machine is reduced and speed of the vehicle raised. The foregoing description refers only to vehicles each with a single set or group of motors.

The present improvements are also applicable to vehicles one or more contain a plurality of such motor groups.

This application is carried out in an analogous manner to that shown in Figs. 10 and 11. The working is always effected by means of the relays, and the current required for their manipulation is supplied from the battery to the point of control. In every case each vehicle forms an entirely self-contained power generator which produces the mechanical and electrical energy required for driving the vehicle. The improved arrangement of two or more points of control differs essentially from the arrangements employed for purely electrical vehicles. In mixed working the motive power is mainly mechanical, and there is no electrical current during normal working, whereas in the case of purely electrical vehicles the electrical current is the sole driving medium. Further in mixed working the electrical machine serves only to regulate the working of the gas motor, and is merely an auxiliary motor regulator for the heat energy. In cases where a number of vehicles are coupled together to form a train, there is no electrical connection between the vehicles for the transmission of the electrical driving power, nor any exchange of current from one vehicle to another. In no case is there any electrical power connection such as that represented by the trolley or the third rail in the case of purely electrical vehicles.

Each vehicle works independently and separately of the others; the auxiliary circuit serves only as an auxiliary regulator for the energy delivered by the gas motor and it regulates separately on each vehicle the production of the power required for driving that vehicle.

Having now described my invention what I claim as new and desire to secure by Letters Patent is:—

1. In a motor vehicle preferably running on rails the combination of a gas motor, a storage battery, an electrical machine capable of working as an electric motor and also as a current generator connected in series with said storage battery, said gas motor and said electrical machine constituting together a motor group, means for starting said motor group, means for coupling said motor group to a road wheel axle of the vehicle, means for reversing the direction of motion of said motor group, means for braking said road wheel axle, means for regulating the speed of said road axle, and apparatus at a plurality of points of control whereby a driver can actuate and control each and all of said means from any one of said points of control, said apparatus at each point comprising a single controller; as set forth.

2. A driving set for vehicles comprising a gas motor, an electrical machine capable of working as a motor and a generator, a mechanical coupling between said electrical machine and said gas motor, and means for transmitting motion to a road wheel axle of the vehicle, buffer batteries, electrical connections between said batteries and the electrical machine, and means for automatically insuring the correct cycle of operations for effecting reversing of the direction of working of said gas motor and said electrical machine; as set forth.

3. A driving set for vehicles comprising a gas motor, an electrical machine capable of working as a motor and a generator, a mechanical coupling between said electrical machine and said gas motor, and means for transmitting motion to a road wheel axle of the vehicle, buffer batteries, electrical connections between said batteries and the electrical machine and means for automatically insuring the correct cycle of operations for effecting reversing of the direction of working of said gas motor and said electrical machine, together with means for ensuring that said gas motor shall have been rendered inoperative before being started in reverse direction by said electrical machine; as set forth.

4. A driving set for vehicles, comprising a gas motor, an electrical machine capable of working as a motor and a generator, a mechanical coupling between said electrical machine and said gas motor, and means for transmitting motion to a road wheel axle of the vehicle, buffer batteries, electrical connections between said batteries and the electrical machine, distribution mechanism for said gas motor, means for reversing the said distribution mechanism, a plurality of fixed contact studs, electrical connections between the reversing means and two of said fixed contact studs, further connections between said reversing means and the buffer battery, and additional connections between the buffer battery and another of said fixed contact studs, a controller drum, two sets of contact pieces mounted thereon and separated by a distance greater than the width of said fixed contact studs, brushes on said electrical machine, electrical connections between said brushes and two of said fixed contact studs; as set forth.

5. In a motor vehicle preferably running on rails the combination of a gas motor, a storage battery, an electrical machine capable of working as an electric motor and also as a current generator, connected in series with said storage battery, said gas motor and said electric machine constituting together a motor group, a road wheel axle, means for transmitting motion from said electrical machine to said axle of the vehicle and from said axle to said electrical machine, means energized by said storage battery with fixed and hand controlled movable contacts for controlling the working of said gas motor, a plurality of points of control with means at each point for insuring in succession, setting the engine parts for forward or reverse running, starting the electric machine, starting the engine, clutching and speed variation.

6. In a motor vehicle train preferably running on rails, the combination of a gas motor on each vehicle, a storage battery on each vehicle, an electrical machine on each vehicle capable of working as an electric motor and also as a current generator connected in series with the storage battery on said vehicle, said gas motor and said electrical machine on each vehicle constituting together a motor group, a road wheel axle, means for transmitting motion from the electrical machine on each vehicle to the road wheel axle of said vehicle, and from said road wheel axle to said electrical machine, means energized by the storage battery on each vehicle for controlling the working of the gas motor on said vehicle and apparatus whereby the workings of said motor group and the propulsion of the vehicle can be controlled from any one of a plurality of points of control said apparatus at each point comprising means for insuring in succession starting the electric machine, starting the heat engine, clutching, speed variation, together with braking and engine reversal, these means being incorporated in a single controller.

7. In a motor vehicle preferably running on rails, the combination of a gas motor driving a road wheel axle of the vehicle, a storage battery, an electrical machine capable of working as an electric motor and also as a current generator, connected in series with said storage battery, said gas motor and said electrical machine constituting together a motor group, a main electrical circuit between said gas motor and said electrical machine, a plurality of points of control, a plurality of regulators of the drum type, one at each of said points of control, mechanism for starting said gas motor, mechanism for coupling said gas motor to said road axle, mechanism for braking for said road axle and means including auxiliary electric circuits between said starting, speed varying, coupling and braking mechanism and each of said regulators for effecting starting, coupling, speed regulation and braking from any one of said points of control.

In testimony whereof I have signed my name to this specification in the presence of two subscribing witnesses.

HENRI PIEPER.

Witnesses:
 EMIL HEPLIA,
 LOUIS BERCK.